United States Patent [19]
Garthwaite et al.

[11] Patent Number: 5,187,468
[45] Date of Patent: Feb. 16, 1993

[54] POINTING DEVICE WITH ADJUSTABLE CLAMP ATTACHABLE TO A KEYBOARD

[75] Inventors: Charlie Garthwaite, Kirkland; Bridget Cameron, Seattle; Stuart Ashmun, Seattle; Allan H. Stephan, Seattle; Michael D. Nelson, Seattle, all of Wash.

[73] Assignee: Microsoft Corporation, Redmond, Wash.

[21] Appl. No.: 425,527

[22] Filed: Oct. 23, 1989

[51] Int. Cl.⁵ .................................. G09G 3/02
[52] U.S. Cl. ................................ 340/709; 340/710
[58] Field of Search ............... 340/709, 710, 711; 341/20, 22, 35; 400/717

[56] References Cited

U.S. PATENT DOCUMENTS

| | | |
|---|---|---|
| D. 266,563 | 10/1982 | White . |
| D. 272,921 | 3/1984 | Kim . |
| D. 281,776 | 12/1985 | Griffin . |
| D. 282,848 | 3/1986 | Depraz . |
| D. 288,930 | 3/1987 | Barbera et al. . |
| D. 289,306 | 4/1987 | Burnstein et al. . |
| D. 291,318 | 8/1987 | Kim . |
| D. 292,600 | 11/1987 | Wagner . |
| D. 300,324 | 3/1989 | Akagi et al. . |
| D. 302,010 | 7/1989 | McLaughlin et al. . |
| D. 302,426 | 7/1989 | Bradley et al. . |
| D. 307,739 | 5/1990 | Grant . |
| D. 315,552 | 3/1991 | Sacherman . |
| D. 315,896 | 4/1991 | Brown . |
| 3,395,589 | 8/1968 | Gersten ............................ 74/471 |
| 3,541,541 | 11/1970 | Engelbart ...................... 340/324 |
| 3,635,083 | 12/1971 | Bose ................................ 74/471 |
| 3,835,464 | 10/1974 | Rider ............................. 340/324 |
| 3,987,685 | 10/1976 | Opocensky ..................... 74/471 |
| 4,245,244 | 1/1981 | Lijewski et al. ................ 358/111 |
| 4,310,839 | 1/1982 | Schwerdt ....................... 340/712 |

(List continued on next page.)

FOREIGN PATENT DOCUMENTS

| | | |
|---|---|---|
| 0186035 | 10/1984 | Japan .............................. 340/710 |
| 1526428 | 9/1978 | United Kingdom . |
| 2154306 | 4/1985 | United Kingdom . |

OTHER PUBLICATIONS

Bruce F. Webster, "The Macintosh Portable," *MAC-WORLD*, Nov., 1989.
IBM Technical Disclosure "Mouse/Keyboard Concept Incorporating Unique Devices for Controlling CRT Display Cursors" vol. 27, No. 10B, pp. 66299–6305, Mar. 1985.
Logitech Trackman Desktop Model Package bearing copyright date of 1989.
PC-TRAC Trackball by Microspeed; operating model Package bearing copyright date of 1990.
FastTrap Trackball by Microspeed; operating model Package bearing copyright date of 1987.
Honeywell Lynx Trackball Model No. LX200-192-E, bearing internal copyright date of 1985.

*Primary Examiner*—Ulysses Weldon
*Attorney, Agent, or Firm*—Seed and Berry

[57] ABSTRACT

A pointing device which is removably attachable to a keyboard is disclosed. The pointing device is coupled to an attachment assembly, the attachment assembly being removably and selectively attachable to the keyboard. The attachment assembly includes a clamp and a tilting assembly. The clamp includes a variable width clamp to permit the pointing device to be attached to any one of a number of different keyboards or in different positions on the same keyboard. The tilting assembly permits the user to select whether the pointing device is in a horizontal, vertical or other orientation. A rotatable ball of the pointing device is retained in contact with the rotation sensing encoders regardless of the orientation of the housing. The buttons for activating switches to enter commands into the computer overlap a top portion and a side portion of the pointing device. The switches are activated by a user pressing downward on the top region or inward from the side region.

29 Claims, 9 Drawing Sheets

U.S. PATENT DOCUMENTS

| | | | |
|---|---|---|---|
| 4,369,439 | 1/1983 | Broos | 340/710 |
| 4,404,865 | 9/1983 | Kim | 74/471 |
| 4,464,652 | 8/1984 | Lapson et al. | 340/710 |
| 4,533,830 | 8/1985 | Beauprey . | |
| 4,538,476 | 9/1985 | Luque . | |
| 4,559,532 | 12/1985 | Hosogoe | 340/710 |
| 4,562,314 | 12/1985 | Hosogoe et al. | 200/5 R |
| 4,562,347 | 12/1985 | Hovey et al. . | |
| 4,573,925 | 3/1986 | Styers | 434/49 |
| 4,581,609 | 4/1986 | Hosogoe et al. | 340/710 |
| 4,594,586 | 6/1986 | Hosogoe | 340/710 |
| 4,595,070 | 6/1986 | Hodges | 180/125 |
| 4,612,539 | 9/1986 | Hosogoe et al. | 340/710 |
| 4,613,853 | 9/1986 | Hosogoe et al. | 340/710 |
| 4,635,496 | 1/1987 | McTyre | 340/710 X |
| 4,652,871 | 3/1987 | Tsukada et al. | 340/710 |
| 4,670,743 | 6/1987 | Zemke | 340/709 |
| 4,686,522 | 8/1987 | Hernandez et al. | 340/709 |
| 4,734,685 | 3/1988 | Watanabe | 340/710 |
| 4,739,315 | 4/1988 | Soma et al. | 340/710 |
| 4,786,768 | 11/1988 | Langewis et al. | 340/709 X |
| 4,786,892 | 11/1988 | Kubo et al. | 340/365 |
| 4,797,665 | 1/1989 | Ida et al. | 340/710 |
| 4,799,049 | 1/1989 | Avila | 340/710 X |
| 4,801,931 | 1/1989 | Schmidt . | |
| 4,818,851 | 4/1989 | Kimura | 235/472 |
| 4,913,387 | 4/1990 | Tice | 400/717 |
| 5,008,528 | 4/1991 | Duchon . | |

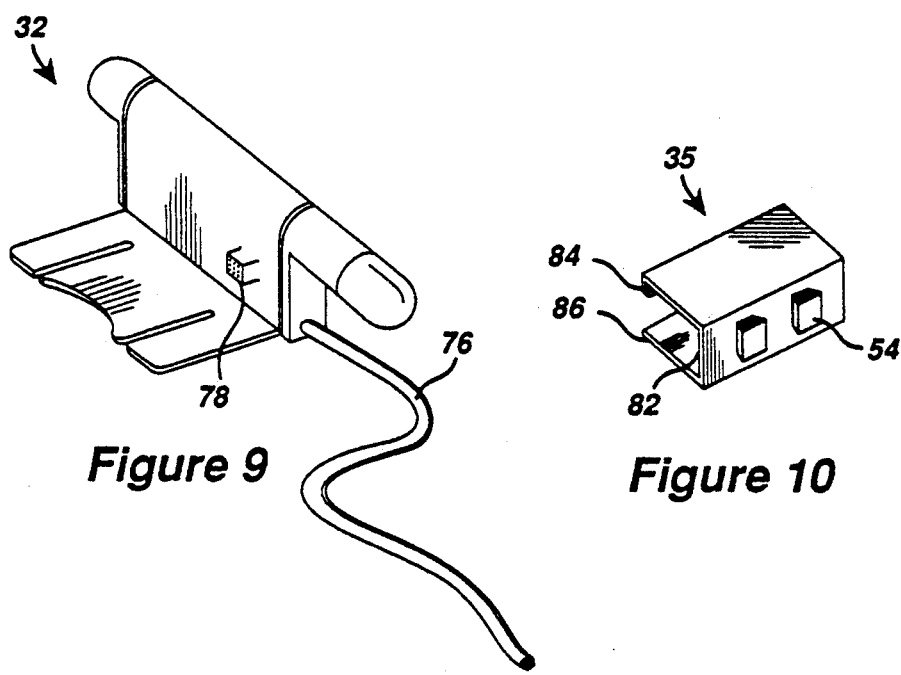
Figure 9
Figure 10
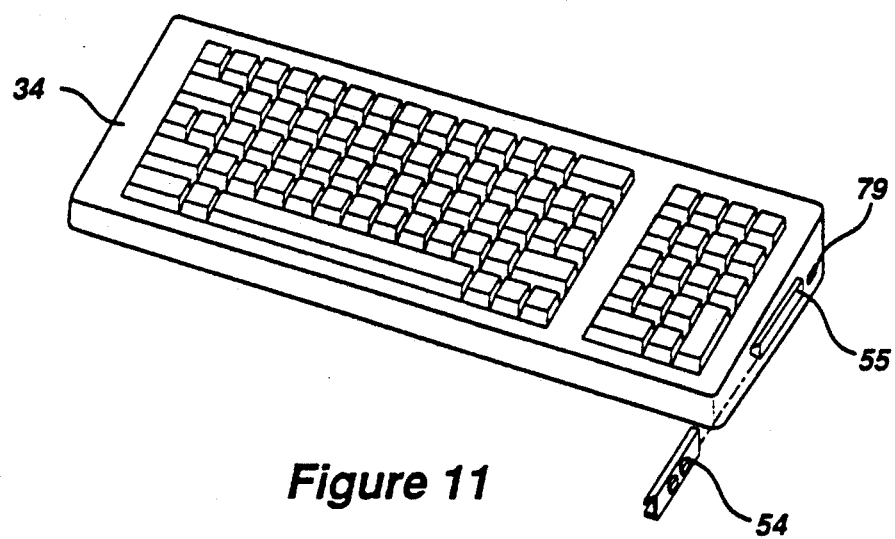
Figure 11

POINTING DEVICE WITH ADJUSTABLE CLAMP ATTACHABLE TO A KEYBOARD

TECHNICAL FIELD

This invention is related to a pointing device for entering commands into a computer, and more particularly, to a track ball which is removably attachable to a laptop, portable or desk top computer.

BACKGROUND OF THE INVENTION

Pointing devices for entering commands into a computer, such as mouses, joy sticks, x-y tablets, wire pens and track balls, are well known in the art. Some pointing devices include a rotatable ball and one or more depressible buttons. Electronic encoders sense rotation of the ball and generate a signal indicative of the ball's rotation to control movement of a cursor on the screen of the computer. A joy stick type pointing device moves a cursor based on the position of the joy stick. Other pointing devices similarly enter commands into a computer. Depressing the button, whether on a mouse, joy stick or track ball, permits the user to enter various commands into the computer, based on the location of the cursor. For example, depressing the button may pull down a menu; create starting, ending, or other points in a graphic pattern on the screen; move objects to different locations on the screen; and the like.

Pointing devices having a rotatable ball are generally grouped into two categories, a mouse type or a track ball type. In a mouse-type device, the ball extends from the bottom of a housing for contacting a table top or other work surface. Movement of the housing across the table top causes rotation of the ball and the appropriate movements of the cursor on the screen. FIG. 1 of U.S. Pat. No. 4,612,539, to Hosogoe et al., illustrates a prior art mouse-type device. In a track ball-type pointing device, the rotatable ball faces upward in a housing positioned on a table top. The rotatable ball is exposed above the housing for rotation by the hand of a user. The housing may include one or more depressible buttons to enter commands into the computer, based on the., position of the cursor on the screen. U.S. Pat. No. 4,786,892, to Kubo et al., is an example of a pointing device which is alternatively usable as a mouse- or a track ball-type device.

Prior art pointing devices, particularly a mouse or a track ball type, are not easily usable with laptop or portable computers. Pointing devices having a ball often require a work surface against which to roll the ball or upon which the housing of the track ball must sit. A laptop computer is often used in an environment where a work surface is not provided. For example, laptop or portable computers may be used on an airplane or while sitting in a chair with no desk or in a chair spaced from a desk. Other computers, such as portable computers and the standard personal computer, may be used in an environment which does not provide a work surface to facilitate operation of the pointing device.

SUMMARY OF THE INVENTION

It is therefore an object of this invention to provide a pointing device which is operable in an environment without a work surface.

It is another object of this invention to provide a pointing device which is attachable to a computer for use as a support surface.

It is another object of this invention to provide a pointing device whose orientation with respect to the keyboard, whether vertical, horizontal, or other orientation, is selectable by a user.

It is a further object of this invention to provide buttons on the pointing device which are activated by pressing either from the top or from the side.

It is a further object of this invention to provide a plurality of buttons as part of the pointing device to permit the user to select which of the buttons will be operational for inputting commands into the computer.

These and other objects of the invention, as will be apparent herein, are accomplished by providing an attachment assembly for removably attaching a pointing device to a computer. The attachment assembly includes a clamping assembly and a tilting assembly. The attachment assembly may be attached to the screen, keyboard or some other part of the computer. The clamping assembly includes a variable width clamp to permit attachment to any one of a number of different keyboards. Further, the user may select whether to attach the clamp member to the right side, front, left side, or any other position on the keyboard. The coupling of the tilting assembly to the clamping assembly includes a pivot. The user selects whether the pointing device is in a horizontal, vertical, or other orientation.

The rotatable ball of the pointing device is retained in contact with the rotation-sensing encoders regardless of the orientation of the housing. A lower ball retainer is in contact with the ball at a point below the center line of the ball. An upper ball retainer is in contact with the ball at a point above the center line of the ball. The position of the two retainers ensures that ball rotation is uniformly sensed whether the track ball is in a horizontal, vertical, or any other orientation.

The buttons overlap the top and side of the pointing device. Pressing down on the top of the button or inward on the side of the button activates the switches for entering commands into the computer. The pointing device includes form buttons which are selectively enabled by the user for inputting commands into the computer.

BRIEF DESCRIPTION OF THE DRAWINGS

FIG. 9 is an isometric view of an alternative embodiment of the attachment assembly having an electrical connection to the computer.

FIG. 10 is an alternative embodiment of a clamping assembly for coupling to the keyboard.

FIG. 11 is an alternative embodiment of a clamping assembly rigidly extending from the keyboard.

DETAILED DESCRIPTION OF THE INVENTION

Figure 1:
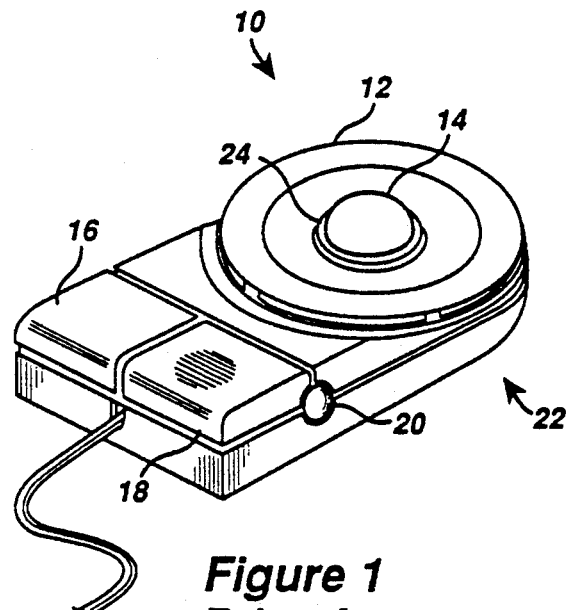
FIG. 1 is an isometric view of a prior art pointing device.
Figure 2:
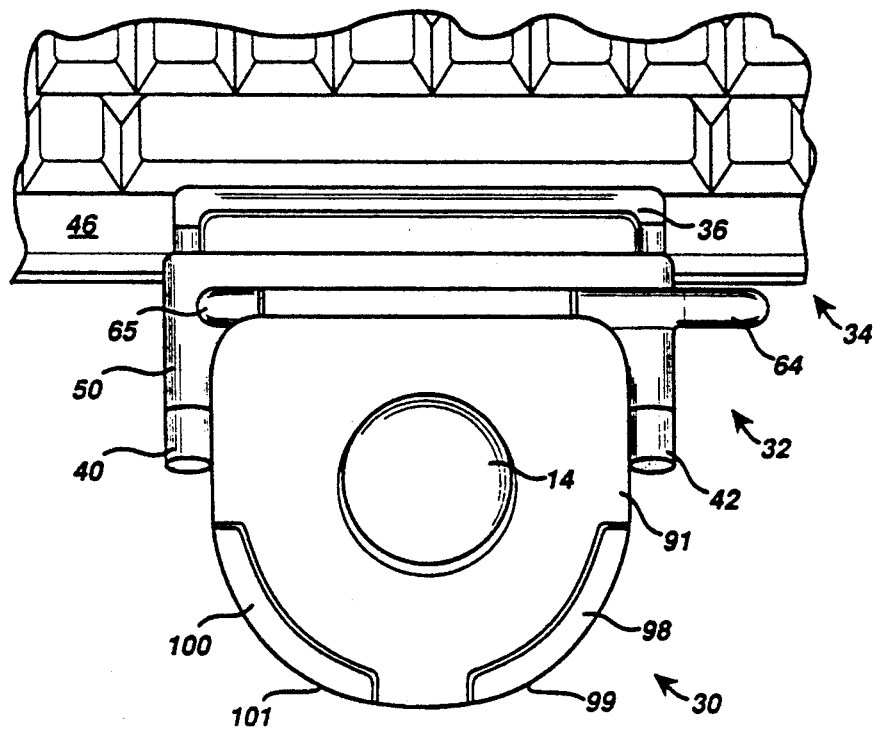
FIG. 2 is a top isometric view of the inventive pointing device and attachment assembly coupled to the front of a keyboard of a computer.
Figure 20:
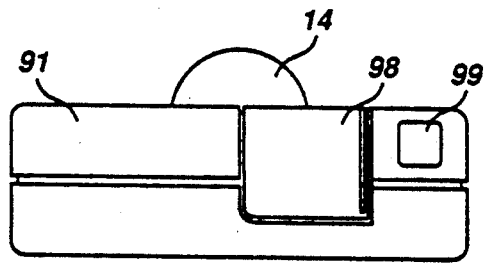
FIG. 20 is a side elevational view of FIG. 19.

FIG. 1 illustrates a prior art pointing device for entering commands into a computer (not shown). The device of FIG. 1 is similar in structure and operation to the device illustrated and described in U.S. Pat. No. 4,786,892, to Kubo et al. (the '892 patent). The prior art pointing device 10 includes a ball 14 and buttons 16, 18 and 20 within a housing 12. As illustrated in FIG. 20 of the '892 patent, the ball 14 may extend out of the bottom of the housing to operate the pointing device 10 as a mouse-type device. Alternatively, the ball 14 may extend out of the top of the housing to operate the pointing device 10 as a track ball-type device. (See FIGS. 21 and 22 and column 8 of the '892 patent.) A bottom surface 22 remains in contact with the upper surface of a work table whether the pointing device 10 is in the mouse or a track ball mode.

As shown in FIG. 1, the buttons 16 and 18 overlap both the top and the side of the housing 12. However, the buttons 16 and 18 activate microswitches in the housing only if depressed downward from the top. That is, pressing on the switches 16 or 18 from the side inward or from the front inward does not activate the microswitches below the buttons and does not send a control signal to the computer. Similarly, pulling on any portion of the buttons 16 and 18 does not activate the respective microswitches within the housing 12. The user is required to depress the buttons downward from the top to activate the microswitches. Depressing the button 20 from the side inward causes activation of the microswitch associated with button 20 within the housing 12. Depressing button 20 from the top downward or pulling on the button 20 does not activate the microswitch in the housing.

The prior art of FIG. 1 has numerous disadvantages. Namely, a work surface is required for the pointing device 10. In addition, the user must press on the buttons 16, 18 and 20 in a specific direction to ensure activation of the microswitches and the inputting of commands into the computer. Because of the structural relationship between the ball 14 and the switches 16, 18, and 20 and the design of housing 12, the user's hand must be oriented in a prescribed position on the pointing device 10 for operation.

FIGS. 2-5 illustrate a pointing device 30 and attachment assembly 32 according to the invention. The pointing device 30 is removably attached to computer keyboard 34 via the attachment assembly 32.

Figure 3:
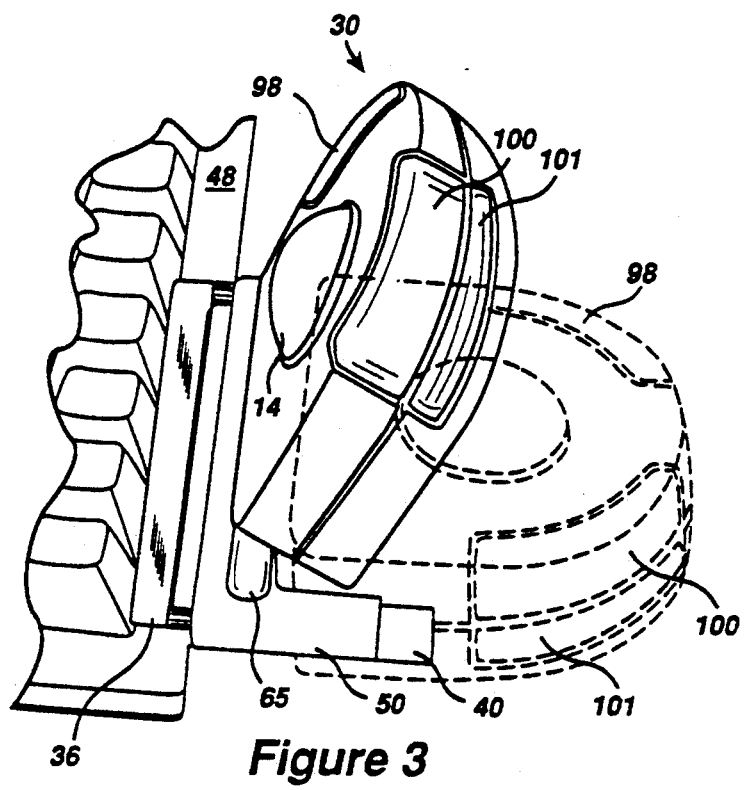
FIG. 3 is a front isometric view of the inventive pointing device attached to the side of a keyboard positioned alternatively in generally a vertical or a horizontal orientation.
Figure 4B:
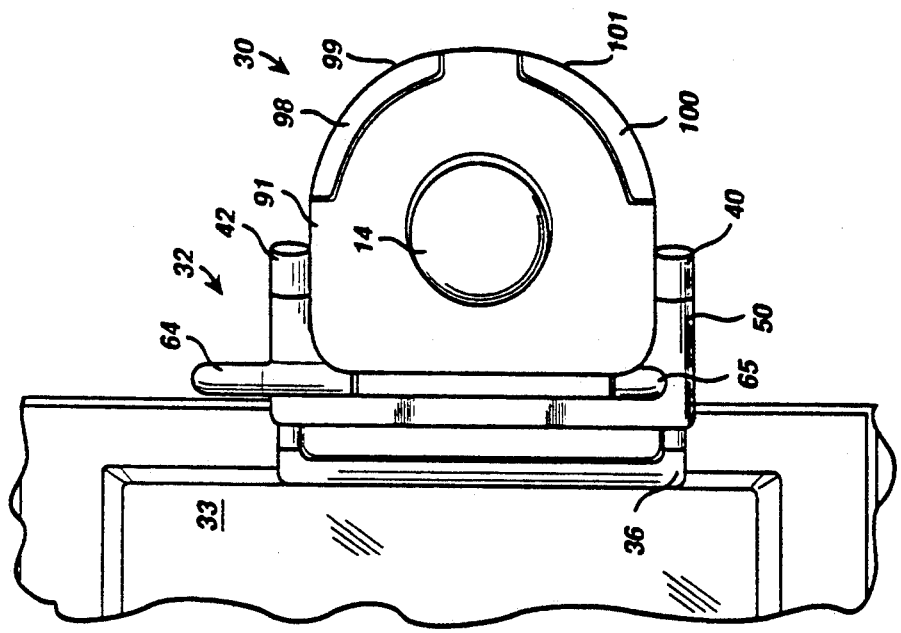
FIG. 4b is an isometric view of the attachment assembly coupled to the screen of a computer.
Figure 4A:
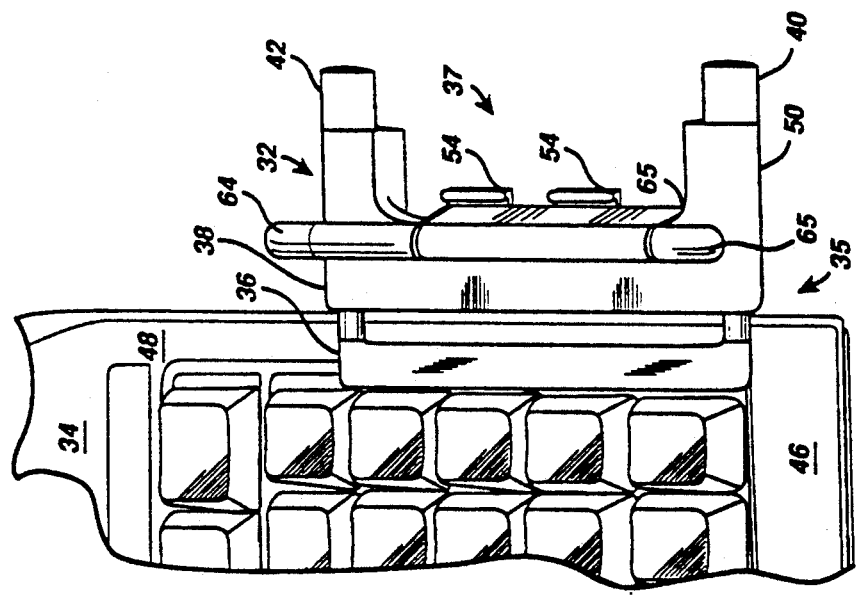
FIG. 4a is a top isometric view of the attachment assembly coupled to the side of the keyboard.
Figure 6:
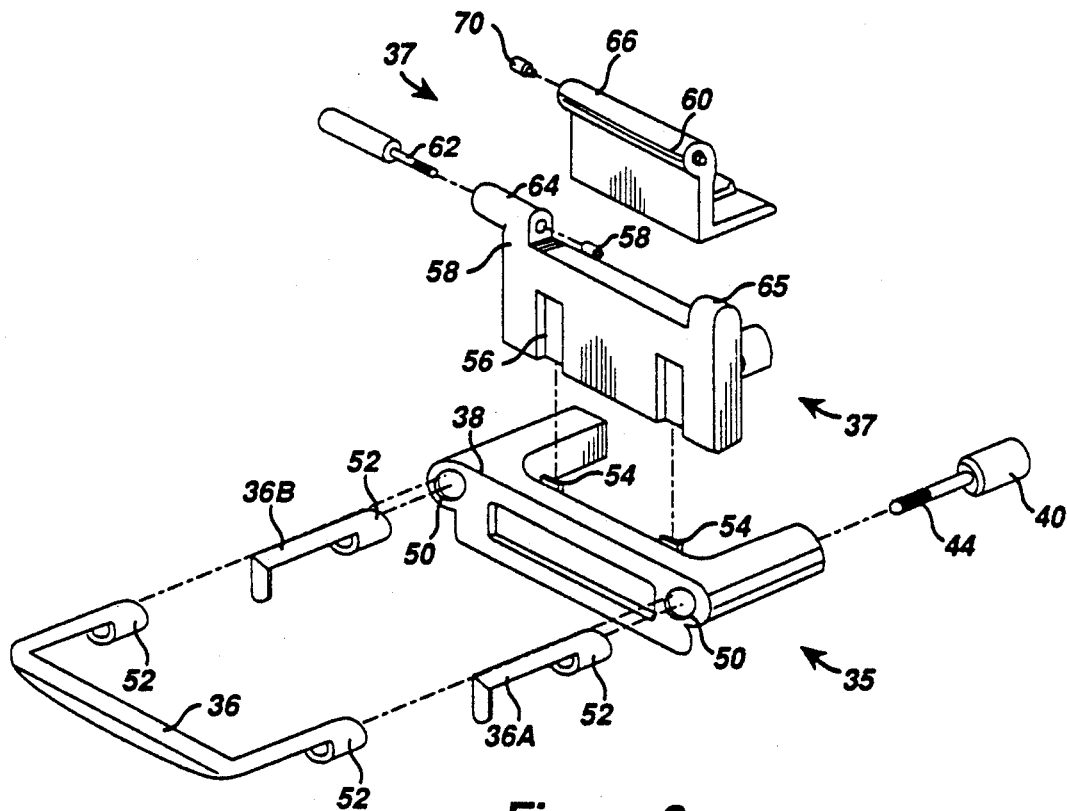
FIG. 6 is an exploded isometric view of the attachment assembly.
Figure 7:
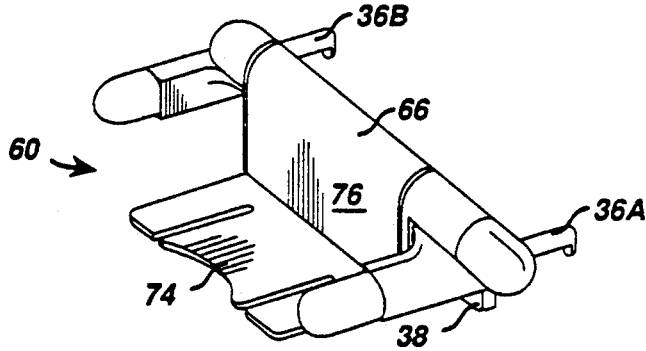
FIG. 7 is an isometric view of the assembled attachment assembly.
Figure 8:
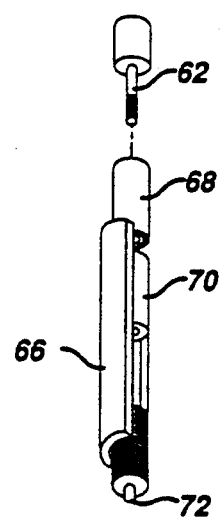
FIG. 8 is an isometric view of a locking member for holding the tilting assembly in a fixed position.

As best illustrated in FIGS. 4a and 6, the attachment assembly 32 includes a clamping assembly 35 and a tilting assembly 37. The clamping assembly 35 includes a clamp bar 36 and a support member 38. The clamp bar 36 may be a unitary, single-blade member extending from threaded member 40 to threaded member 42. Alternatively, the clamp may be a dual-blade type, having separate clamp members 36A and 36B coupled to threaded members 40 and 42, respectively. Support member 38 includes channels 50 through which the shanks 44 extend for mating with respective threaded portions 52 of clamp member 36. Rotation of threaded members 40 and 42 draws the clamp member 36 toward the support member 38 for clamping a member between them. The shaft 44 of threaded members 40 and 42 has a length sufficient to permit the clamping member 36 and support member 38 to clamp over objects of many different widths. As illustrated in FIG. 7, the attachment assembly 32 is clamped to a front member 46 adjacent the space bar of the keyboard 34. As illustrated in FIGS. 3 and 4, the attachment assembly 32 is clamped to a right side member 48 of the keyboard 34. Similarly, the clamp member 32 may be coupled to the left side of the keyboard 34 or at a top edge opposite the front member 46, if desired. The clamp assembly 35 is thus easily attachable by a user to any portion of the keyboard 34.

The clamp assembly 35 includes docking fixtures 54 for coupling the tilting assembly 37 to the clamp assembly 35. In one embodiment, the docking fixtures 54 are tapered dovetail fixtures and the tilting assembly 37 has mating slots 56 for sliding over the dovetail fixtures 54. Alternatively, the docking fixtures 54 and mating receptacle 56 may be any coupling assembly known in the art. For example, a mounting plate 74 similar to the two types later shown and described for coupling pointing device 30 to the attachment assembly 32 may be used.

The tilting assembly 37 includes a stationary member 58 and a pivoting member 60. The stationary member 58 includes the mating slots 56 for coupling to the clamp assembly 35 in a fixed relationship. A threaded shaft 62 extends through a channel 64 of stationary member 58 and into a channel 66 of tilting member 60. A toothed insert 68 in channel portion 64 mates with a toothed insert 70 in channel 66 of the tilting mechanism for locking the tilting member 60 in a desired position as selected by a user. The channel 66 includes a plunger pivot pin 72 extending into a recess (not shown) in a shoulder 65 of the stationary member 58 for pivotally supporting the tilting member 60. In one embodiment, illustrated in FIGS. 2-5, the support member 38 and stationary member 58 are single, unitary member and are part of the clamping assembly. In this alternative embodiment, the pivoting member 60 is coupled to the clamp assembly 35 by threaded shaft 62. The channel 64, channels 50, and shoulder 65 are part of an integral member with support member 38. This entire portion of the clamp assembly 35 may be formed by injection molding.

To place the pointing device 30 in a generally vertical orientation, as shown in FIG. 3 in solid lines, the user loosens the screw 62, rotates the tilting member 60 upward to the desired orientation, and then tightens the screw 62, locking the pointing device in the desired position. The pointing device 30 may be locked- in any selected orientation about pivot 62. The pointing device 30 may be in a generally horizontal orientation, as shown in phantom lines in FIG. 3. Alternatively, it may be locked in a sloped orientation, such as 30 degrees, 45 degrees, 60 degrees, or the like. If desired, the pointing device 30 may be pivoted beyond the vertical to any selected position, even sufficiently far to invert the ball 14 to the underside of the pointing device 30.

In an alternative embodiment, as illustrated in FIGS. 2-5, the pivot shaft 62 extends completely through the channel 66 of tilting member 60 and screws into mating threads in a recess in the shoulder 65 of stationary member 58. The tilting member 60 is held at the selected position by tightening the pivot screw 62, pulling the channel 64 toward the shoulder 65 having the recess therein to clamp the channel 66 in a selected position between the channel 64 and shoulder 65. Other pivoting and locking or clamping mechanisms for permitting the tilting member 60 to pivot with respect to the stationary member 58 may be used, if desired.

Figure 5:
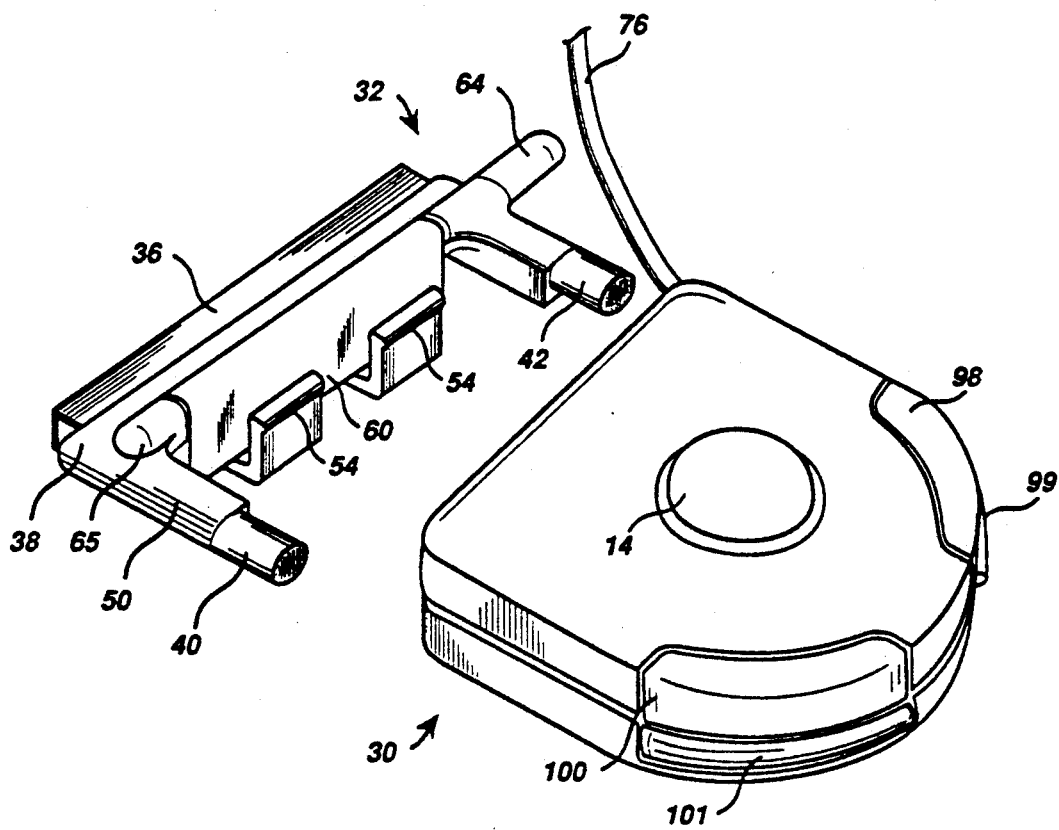
FIG. 5 is a front isometric view of the pointing device and the attachment assembly separated from each other.

The tilting member 60 includes a mounting plate 74 for retaining the pointing device 30. In the embodiment of FIGS. 6 and 7, the mounting plate 54 extends perpendicular to a wall 76 of tilting member 60. The pointing device 30 includes a mating slot on the underside for sliding over the plate 54 to attach the pointing device 30 to the tilting member 60. The pointing device 30 may be locked in position on the plate 74 with screws, clamps, glue, or the like. FIGS. 4a and 5 illustrate an alternative embodiment of the mounting plate 54. In the alternative embodiment, the mounting plate 74 extends in juxtaposition to the wall 76 of the tilting member 60. The pointing device 30 includes a pair of slots for sliding onto the plate 54, in a mating, coupling relationship. Any suitable coupling, such as a dovetail, tongue-and-groove, or the like, between the pointing device 30 and attachment assembly 35 may be used in place of the two embodiments illustrated herein.

As shown in FIG. 4b, the pointing device 30 is attachable to the screen portion 35 of the computer. When coupled adjacent the screen, such as to a casing 39 as shown in FIG. 4b, the pointing device 30 is held in a generally vertical orientation. The pointing device orientation may be changed by the user, if desired, tilting it inward towards the screen, backwards or the like. In a laptop computer, the keyboard, screen and electronics are usually in a single housing. The keyboard, screen and the like are thus considered part of the computer. In a personal computer or terminal coupled to a network, the keyboard 34, screen 35 and other peripherals are also considered elements of the computer for purposes of this invention. Attaching the pointing device 30 to a keyboard coupled to a large main frame thus falls within the scope of this invention. Similarly, the pointing device 30 may be attached, via the clamping assembly 35, to the arm of a chair, a telephone, a drawer, a shirt pocket or belt of a user, or any other object to provide convenient operation by a user.

In an alternative embodiment, the pointing device 30 or the tilting assembly 37 are coupled to the side of a keyboard, computer screen, or the like, with other attachment means. An elastomeric snap assembly having one member coupled to the keyboard by an adhesive and the other member sliding into it may be used. Alternatively, a Velcro TM strip may be glued to the keyboard and a cloth surface for removably attaching to the Velcro TM strip coupled to the pointing device 30 or vice versa. The pointing device 30 or tilting assembly 37 may be coupled with magic tape, an adhesive or other clamping means, to the keyboard 34 or other part of the computer, if desired.

As shown in FIG. 9, the attachment assembly 35 may include an electrical cable 76 for connecting to an input port of the computer. A receptacle 78 mates with an input jack of the pointing device 30 for providing electrical coupling between the pointing device 30 and the computer (not shown). In an alternative embodiment, as shown in FIG. 5, the cable 76 extends from the pointing device 30 for coupling to the computer serial port in a manner well known in the art. As is known in the industry, the pointing device may transmit the command via radio-frequency, infrared or some other wireless operation.

FIG. 10 illustrates an alternative clamping assembly 35 in the form of a clip 80. The clip 80 includes a flexible "C"-shaped wall 82 having a flange 84 for fixing it to the keyboard 34. The clip 80 includes a pair of dovetail mounts 54 for receiving the tilting assembly 37, as shown and described with respect to FIG. 6. The clip 80 is made of a flexible, yet resilient, material to permit a user to spread the upper flange 84 sufficiently away from a lower wall 86 to slide the clip over the edge of the keyboard 34. The flange 84 extends down into the depression provided for the keys of the keyboard 34 to hold the clip 80 firmly on the keyboard 34. The clip embodiment of the clamping member 35 has a constant width and is custom-made for each different type of keyboard or computer. A different size clip 80 is required for different keyboards or for coupling to different places on the same keyboard.

FIG. 11 illustrates a dovetail mount 55 extending from the side of a keyboard 34. In the embodiment of FIG. 11, the dovetail mount 55 is formed as an integral, unitary member with the keyboard 34. The tilting assembly 37 is directly coupled to the keyboard via dovetail mount 55. The custom keyboard of FIG. 11 also includes a jack 79 for mating with a receptacle (not shown) of the pointing device 30. Alternatively, the keyboard may not include the jack 79 and the pointing device may be coupled to the computer via a cable 76. The keyboard manufacturer builds the keyboard having dovetail mount 55 for receiving the tilting mechanism 37; and the jack 79. The dovetail mount 55 may be a single mount or a pair of mounts. If manufactured as a single mount, an adapter may be attached to convert it to a pair of mounts 54 as shown in FIG. 11.

Figure 12:
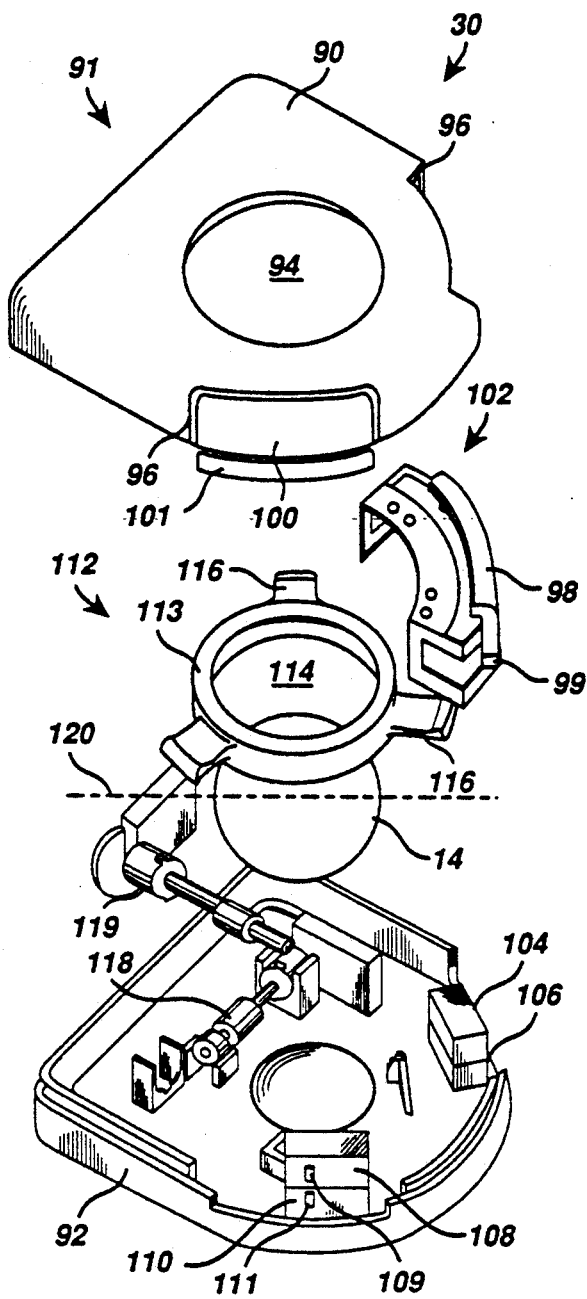
FIG. 12 is an exploded isometric view of the inventive pointing device.

As shown in FIG. 12, the pointing device 30 housing 91 includes an upper housing 90 and a lower housing 92. The upper housing 90 has an aperture 94 through which the ball 14 extends for rotation by a user. The upper housing 90 includes recesses 96 for receiving buttons 98-101. An upper ball retainer 112 is within the housing 91 of the pointing device 30. The upper ball retainer 112 has an aperture 114 with a diameter less than the diameter of the ball for preventing the ball from falling out of the pointing device when it is inverted. The upper ball retainer 112 includes a ring 113 and support flanges 116 for holding the ring 113 within the housing 90. The upper ball retainer 112 contacts the ball 14 above the center line 120 to prevent the ball from falling out when the pointing device 30 is tilted in a vertical or upside-down orientation. A lower ball retainer 118 contacts the ball 14 below the center line 120 to support the ball. The lower ball retainer 118 includes a rotational encoder 119 for generating a signal in response to rotation of the ball 14. Any suitable rotational encoder known in the art may be used for the encoder 119. U.S. Pat. No. 4,562,314, to Hosogoe et al., incorporated herein by reference, illustrates a rotational encoder suitable for use with this invention.

While the lower ball retainer 118 shown herein includes an encoder, the retainer 118 may be merely a ring, a roller bearing, or any other ball retainer in contact with the ball 14 below the center line for retaining the ball. The encoders may contact the ball at any point on its surface. For example, the encoders may be adjacent or part of upper ball retainer 112. The encoding may be accomplished through contact of the ball 14 above the center line 120, the lower retaining member 118 merely providing support.

The center line 120 of the ball 14 is defined relative to the housing 91 as extending generally in a plane parallel to the bottom of the housing. When the housing is in a generally vertical orientation, as shown in FIG. 3, the center line 120 remains in the same position relative to the housing, though it is vertical in absolute sense. The center line may thus extend generally vertically, or at some angle.

As shown in FIG. 12, the support flanges 116 and the ring 113 are rigid members. The ball 14 is firmly retained against the lower ball retainer 118 and encoders 119, regardless of the orientation of the pointing device 30. The flanges 116 are relatively rigid, nonresilient members and hold the ring 113 in a stationary position relative to the housings 90 and 92 and the internal structure within the pointing device 30. The encoders 119 may include a spring, such as that shown in the '314 patent or in U.S. Pat. No. 4,612,539, to bias them into contact with the ball 14 and provide some give relative to the rigid members 116, if desired.

Figure 13:
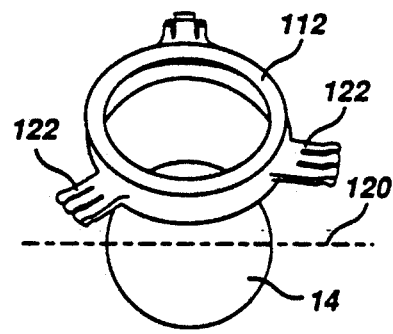
FIG. 13 is an isometric view of an upper ball retainer having a leaf spring.

As shown in FIG. 13, an alternative embodiment of the upper ball retainer 112 includes a molded, unitary member, multistage leaf spring 122. The multistage leaf spring 122 is an elastically deformable, resiliently biased member. The leaf spring 122 biases the ball 14 into the lower ball retaining member 118. The resilient member 122 ensures that the ball 14 is firmly biased against the encoders even though the pointing device is in a vertical orientation, inverted, or in any other orientation.

Figure 14:
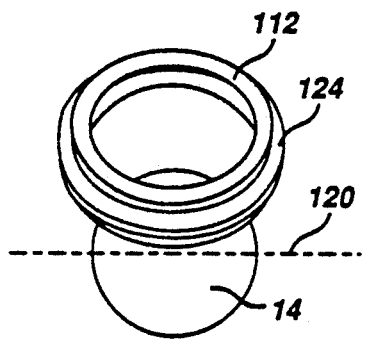
FIG. 14 is an isometric view of an alternative embodiment of an upper ball retainer having a foam-type spring.

An alternative embodiment of a spring is shown in FIG. 14. The upper ball retainer 112 includes a foam-type spring 124 for applying a biasing pressure against the ball 14. The spring 124 is similar in function and operation to the leaf springs 122, as shown in FIG. 13. A coil spring, comb disk spring, or other type of spring may be used in place of springs 122 or 124.

Figure 15:
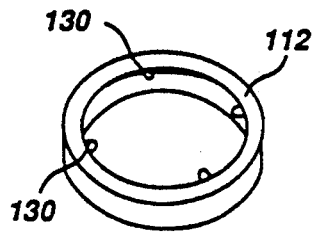
FIG. 15 is an isometric view of an alternative embodiment of an upper ball retainer having bearings.
Figure 15:
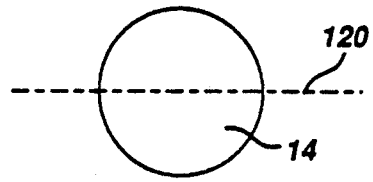

As shown in FIG. 15, the upper ball retainer 112 may include a plurality of bearings 130 contacting the ball 14 above the center line 120. The bearings 130 provide a substantially friction-free surface in the inner diameter of the ring 113 to provide smooth and easy rotation of the ball 14. The bearings 130 may be used with a rigid ring 113 not having any spring, as shown in FIG. 15. The ball 14 is held sufficiently tight against the encoders 118 that accurate encoding occurs even though the pointing device 30 is vertically oriented or inverted. The bearings 130 may be fixed bearings, roller bearings or any other type of bearing suitable for use with ring 112. The bearings 130 may also be used in combination with a ring 113 having a spring therein such as the leaf spring of FIG. 13, the foam-type spring of FIG. 14, or the like.

Figure 16:
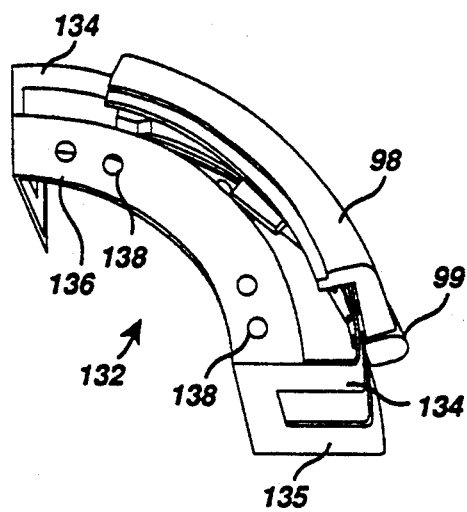
FIG. 16 is an isometric view of a mounting assembly for buttons in the housing.
Figure 17:
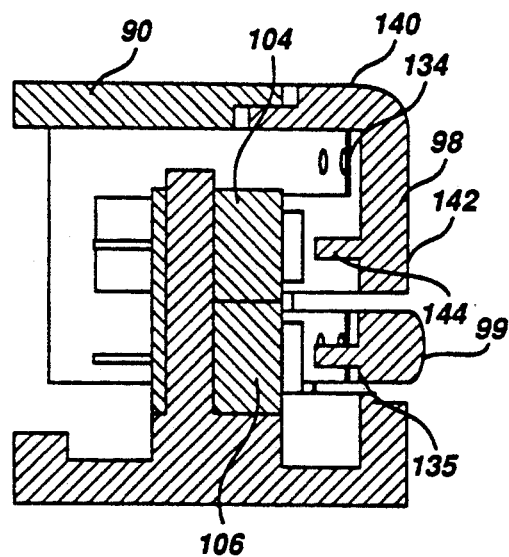
FIG. 17 is a partial cross-sectional view of the button mounting assembly of FIG. 16.

FIGS. 16 and 17 illustrate a support frame 132 for the buttons 98 and 99 to facilitate activation of the microswitches 104 and 106. Button 98 extends from the top surface of housing 90, around the corner, and along the side of the housing 90. The buttons 98 and 99 are mounted on support frame 132. The support frame 132 includes a coupling member 136 rigidly attached to the underside of housing 90 through fixtures 138 by any suitable method known in the prior art, such as plastic welding or the like. Sheet metal support ribbons 134 and 135 support buttons 98 and 99, respectively. The buttons 98 and 99 are coupled to strips 134 and 135 by any suitable method, such as hot gluing, plastic welding, or the like. As best shown in FIG. 12, microswitches 104, 106, 108 and 110 are located within the housing 91 for activation by the respective buttons 98-101, as shown in FIG. 12. Microswitches 104, 106, 108, and 110 include switch elements 105, 107, 109 and 111, respectively.

As shown in FIG. 17, the button 98 is spaced from the housing 90 to permit the button to move inward when depressed. Pressing of the button 98 from the side 142 inward causes the support member 134 to elastically deform inward to depress switch element 105 and activate microswitch 104 by contact with flange member 144. Depressing the button 98 on the top surface 140 also activates the microswitch 104. Depressing the top surface 140, near the corner, causes the support member 134 to rotate clockwise, undergoing an angular displacement. As the support member 134 undergoes an angular displacement, flange member 144 contacts and depresses the switch element 105 to activate the microswitch 104. Thus, a user may apply force either from the top downward or from the side inward to activate microswitch 104.

Button 99 is positioned vertically below and extends horizontally along the length of button 98, as best shown in FIG. 17. The buttons are spaced vertically, one above the other, and extend horizontally around the outer surface of the housing 91. Depressing the button 99 from the side inward activates the microswitch 106 in a manner similar to that described with respect to microswitch 104.

Figure 18A:
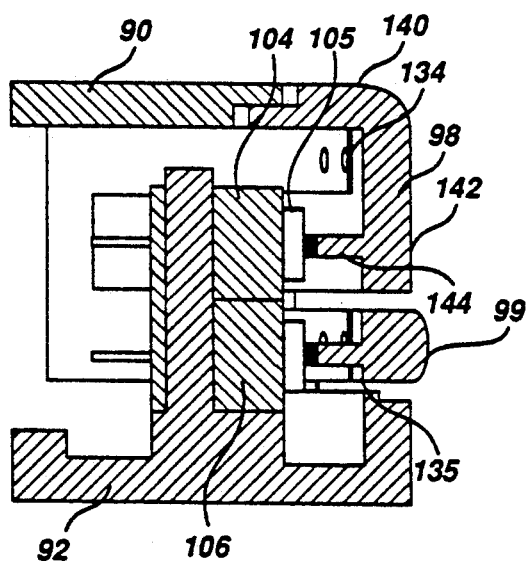
FIG. 18a is a partial cross-sectional view of an alternative embodiment of the button mounting assembly.

FIG. 18a illustrates an alternative embodiment of the activation of microswitches 104 and 106. In the alternative embodiment, the buttons 98 and 99 are physically coupled to the microswitches 104 and 106, respectively. The microswitch 104 is activated when flange 144 of button 98 is pressed toward or pulled away from the microswitch 104. Thus, pressing from the side inward on outside edge 142 of button 98 depresses control button 105 to activate microswitch 104. Pressing on the top edge 140 at a region closer to the center of the housing 91 than the support strip 134 causes the support strip 134 to rotate counterclockwise, undergoing angular displacement and pulling the flange 144 away from the microswitch 104, as shown by the arrow of FIG. 18a. As the flange 144 pulls away from the microswitch 104, the switch element 105 is pulled outward, activating the microswitch 104. The activation of the microswitch 104 by either depressing or pulling on the switch element 105 is indistinguishable to the user and both result in an identical actuation signal being sent to the computer. The advantage of providing activation of the microswitch 104 by flange 44 moving toward or away from the microswitch is that the microswitch is activated by pressing on any region of the button, whether from the side inward, from the top downward, or at any position along the button. Further, if the user presses on the side 142 of the button at a location significantly spaced from the microswitch 104, the switch will still be activated, even though the flange 114 may be pulled away from rather than pushed towards switch element 105. Microswitch 106 is similarly mechanically coupled to button 99 for activation by either pushing or pulling in the alternative embodiment of FIG. 18a, providing similar advantages.

Figure 18B:
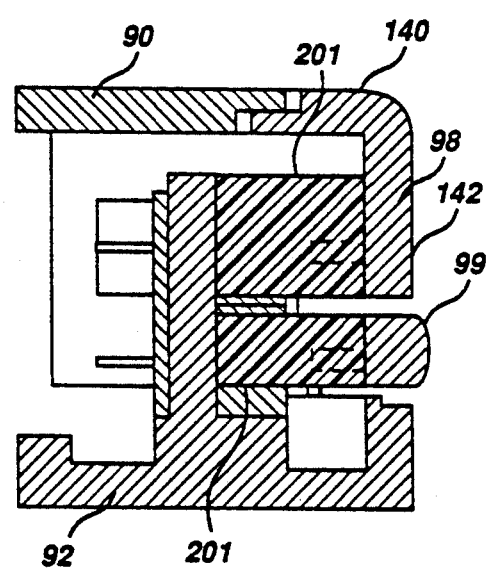
FIG. 18b is a partial cross-sectional view of an alternative embodiment of the button mounting assembly.

In an alternative embodiment shown in FIG. 18b, elastomeric rubber mounts 200 and 201 couple the buttons 98 and 99 to the housing 91. The elastomeric rubber mounts 200 deform whether pushed downward from the top, inward from the side, upward from the bottom or pulled. A rubber with a high damping rate to prevent key bounce and ensure that the buttons return to their normal positions is selected for elastomeric mounts 200 and 201. The buttons are physically coupled to the microswitches, in a manner similar to that shown in FIG. 18a, to activate the microswitches whether the switch element is pushed or pulled.

The mounting members 134 and 135 may be any suitable member permitting deflection of button 98 from the top downward or from the side inward. For example, in the embodiment of FIG. 18, having the button 98 rigidly coupled to the microswitch 104, the support member 134 may be a member that is elastically deformable in two or three dimensions and thus need not undergo angular displacement. Pressing from the top downward would elastically deform such a support member 134 downward, pulling the button 98 away from microswitch 104 to activate the switch. Pressing from the side 142 inward depresses the switch member 105 to activate the microswitch 104. A rubber, plastic, or other rod capable of resilient and elastic deformation would be suitable for use as the support member 134.

The ability to activate a button by either pressing from the top downward or from the side inward provides significant advantages for a pointing device whose orientation may vary as selected by a user. If the user elects to maintain the pointing device in the horizontal orientation, as shown in phantom lines in FIG. 3, he may prefer pressing on the side inward to activate microswitch 104. However, if a vertical orientation is used, the user may desire to press from the top downward, the top now being in the position of a side extending vertically and the side 142 now appearing as a top.

Figure 19:
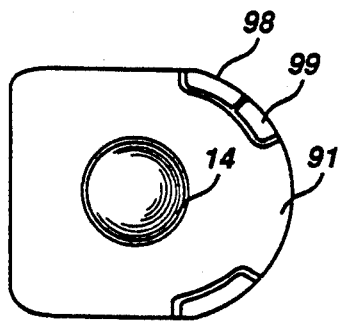
FIG. 19 is a top plan view of an alternative embodiment of button placement.

FIGS. 19-25 illustrate alternative embodiments of button placement around housing 91. As shown in FIG. 19, the buttons 98 and 99 may be spaced horizontally from each other and overlap both the top and sides of the housing 91. The user selectively depresses either button 98 or 99, depending on the command desired to be entered into the computer. FIG. 20 illustrates a button 98 extending over the top and sides of the housing 91 and a button 99 extending from the side of the housing 91 and spaced horizontally from the button 98.

Figure 21:
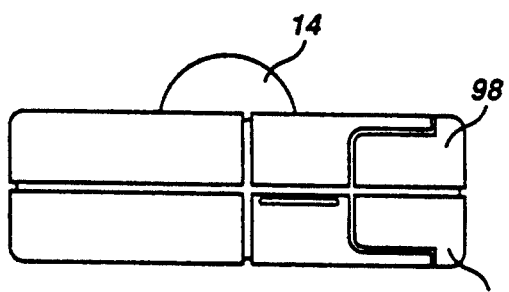
FIG. 21 is a side elevational view of an alternative embodiment of button placement.

FIG. 21 illustrates a button 98 extending over the top and side of the housing 91 and a button 115 extending over the side and bottom of the housing 91. In this embodiment, the buttons 98 and 115 are spaced vertically, one above the other, and both extend generally from a center region, along the side, to respective top and bottom surfaces. A user is able to activate button 98 by pressing from either the top downward or the side inward. Button 115 is activated by pressing from the side inward or from the bottom upward. Of course, if the housing 91 is vertically oriented, as shown in FIG. 3, the relative positions of the buttons 98 and 107 remain the same with respect to the housing 91, although the absolute positions vary. Thus, while the user is still pressing from the bottom of the housing upward to activate the button 101, in relative terms, he is pressing from the side inward, in absolute terms.

Figure 22:
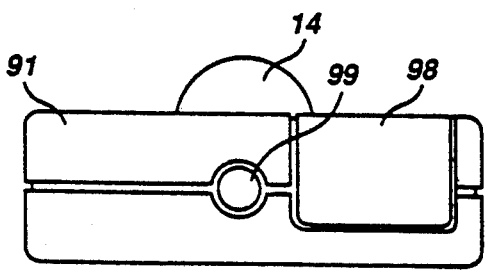
FIG. 22 is a side elevational view of an alternative embodiment of button placement.
Figure 23:
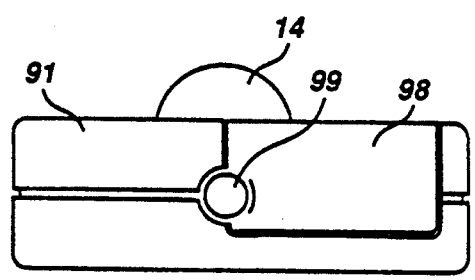
FIG. 23 is a side elevational view of an alternative embodiment of button placement.
Figure 24:
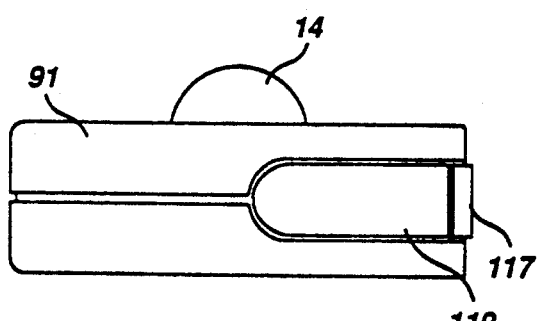
FIG. 24 is a side elevational view of an alternative embodiment of button placement.
Figure 25:
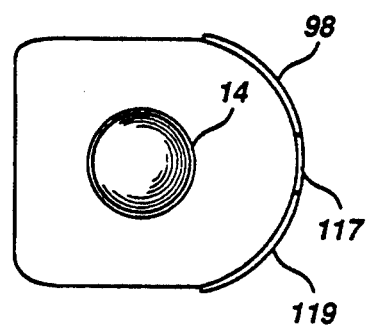
FIG. 25 is a top plan view of the embodiment of FIG. 24.

FIG. 22 illustrates a button 98 overlapping the top and side of the housing 91 and a button 99 spaced horizontally behind button 98. FIG. 23 illustrates a button 98 overlapping the sides and top of the housing 91 and a button 99 surrounded by the button 98. Depressing the circular button 99 within the region 98 activates microswitch 106. Depressing button 98 on any portion thereof, including the regions surrounding button 99, activates microswitch 104. FIGS. 24 and 25 illustrate three buttons 98, 117, and 119 extending from the side of the housing and spaced horizontally from each other. The three buttons 98, 117, and 119 do not overlap the top of the housing 91 and are activate only by pushing from the side inward.

The pointing device 30 may have the respective buttons 98-101 organized in any one of the combinations shown or variations thereof. Alternatively, a switch 93 may be activated by pressing ball 14 downward to enter commands into the computer. The switch 93 is positioned below the ball 14 in housing 91 for activation by pressing ball 14 downward. One switch that may be used is a linear strain gauge 93. The output of the strain gauge 93 corresponds to the downward pressure applied by a user's hand. The rate of cursor movement on the screen is varied based on the output from the strain gauge 93. Software in the computer varies the cursor speed based on this signal. A user selects the desired response based on the output from the strain gauge 93. The user may select a threshold pressure at which the strain gauge 93 output affects cursor movement on the screen or provides some other output signal. For a great deal of pressure, the rate of movement is proportionally sped up (or slowed) to permit more rapid and exact cursor positioning. For example, pressing ball 14 into a lower position causes rapid (or alternatively, fine) cursor movement when the ball is rotated. Having the ball in the standard position provides normal cursor movement. Alternatively, the switch activated by depressing the ball 14 may enter the same commands entered by one of the buttons 98-101. In one embodiment, the user elects whether to enable or disable the switch 93 associated with ball 14. In an alternative embodiment, the switch 93 is not present.

The enabling for operation of the four buttons 98, 99, 100, and 101 is selected by a user. Generally, the user will select a pair of the buttons, either pair 98 and 99 or pair 100 and 101, to be operational for receiving inputs for the computer by software commands entered into the computer. Dip switches in the pointing device may be provided to enable different combinations of buttons. One of the buttons, generally 98, is selected as the primary button for entering certain commands and button 99 is selected as the secondary button for entering different commands with the cursor in the same position. The user selects which of the two buttons is secondary or primary within the enabled pair. The user disables buttons 100 and 101 so that they are not operational. Activation of microswitches 108 and 110 thus does not provide input commands to the computer. The dip switches are coupled in series with the microswitches to open or close a switch connecting the output pins to the computer with the respective microswitches. Switches could also be wired into the pointing device by a person of ordinary skill in the art to permit a user to select the combinations described herein.

The user selects which of the two pairs of buttons will be enabled based upon his desired orientation, position, and use of the pointing device 30. If the pointing device 30 is on the right-hand side of the housing, the user will generally select buttons 98 and 99 as the enabled pair. If the pointing device 30 is on the left-hand side of the housing, the user will generally select the pair 100 and 101 as the enabled pair. In one embodiment, the user may select both of the top buttons 98 and 100 as the enabled pair and disable buttons 99 and 101 extending from the sides of the housing. Alternatively, the user may enable buttons 99 and 101 as a pair and disable buttons 98 and 100. In one embodiment, the user enables all four buttons, with the top two buttons 98 and 100 inputting the same command and the side buttons 99 and 101 inputting the same command as each other, but a different command than buttons 98 and 100. Alternatively, the buttons may each enter a different command into the computer. For example, in one embodiment, all four buttons, only three buttons or some combination, are enabled. Each button inputs a different command into the computer, as programmed in the software by a user. Because each microswitch outputs a uniquely identifiable signal, each button may provide a unique command, if desired. The user is thus able to select which of the buttons are enabled for inputting commands into the computer, an advantage over prior art devices. The user may selectively enable any combination of buttons as pairs or as single buttons.

A plurality of different embodiments for the pointing device 30, attachment assembly 32, button support member 132 and the like, have been shown and described. Each of the different embodiments may be used in combination with the other embodiments shown herein. While not illustrated, the pointing device 30 is a joy stick in one embodiment of the invention. Other computer input devices may be substituted for the pointing device 30, if desired. Any combination or subcombination that operates on the same principles of this invention to perform the same function, falls within the scope of the invention.

We claim:

1. A computer command apparatus for entering commands into a computer having a keyboard as a part thereof, comprising:
    a housing;
    a pointing device means within said housing for generating electrical signals translatable as commands to said computer;
    an attachment assembly removably coupled to said housing, said attachment assembly being adapted to be removably attached to said computer with said computer supporting the entire weight of the attachment assembly and pointing device, said attachment assembly being removably attached to said housing having said pointing device therein to permit the removable attachment of said pointing device means to said computer, said attachment assembly including a computer attachment member which is attachable to said computer to permit removably attaching said attachment assembly directly to said computer; and
    a rotatable member that is a part of said attachment assembly and is coupled to said housing and a stationary member adapted to be coupled to said computer, said rotatable member permitting said housing to be alternatively positioned in generally a horizontal orientation or in generally a vertical orientation.

2. The apparatus according to claim 1, further including a locking member for locking said housing in said selected orientation.

3. A computer command apparatus for entering commands into a computer having a keyboard as a part thereof, comprising:
    a housing;
    a pointing device means within said housing for generating electrical signals translatable as commands to said computer; and
    an attachment assembly removably coupled to said housing, said attachment assembly being adapted to be removably attached to said computer with said computer supporting the entire weight of the attachment assembly and pointing device, said attachment assembly being removably attached to said housing having said pointing device therein to permit the removable attachment of said pointing device means to said computer, said attachment assembly including a computer attachment member which is attachable to said computer to permit removably attaching said attachment assembly directly to said computer, said computer attachment member having as a part thereof a stationary member that includes a variable width clamp means for coupling to said computer at a selected one of many different locations on said computer.

4. The apparatus according to claim 3 wherein said housing includes an electrical coupling extending from said pointing device to said computer.

5. The apparatus according to claim 3 wherein said attachment assembly includes a clamp member that contacts said keyboard and said clamp member includes a flange that extends into a recess of said keyboard to couple said attachment assembly to said keyboard.

6. The apparatus according to claim 5 wherein said attachment assembly includes a resilient member that resiliently biases said flange to remain on said keyboard but which permits said flange to be separated from said keyboard when force is applied to overcome said bias force.

7. The apparatus according to claim 5 wherein said attachment assembly includes a pair of docking fixtures for coupling to said housing.

8. The apparatus according to claim 3 wherein said attachment assembly retains said housing at an angled orientation of 45 degrees with respect to the horizontal.

9. The apparatus according to claim 3 wherein said housing is coupled to an attachment assembly with an easily removeable coupling when force is applied to said housing.

10. The apparatus according to claim 9 wherein said easily removeable coupling includes velcro.

11. The apparatus according to claim 9 wherein said easy removeable coupling includes tape.

12. The pointing device according to claim 3 wherein said housing includes a bottom surface and said attachment assembly retains said housing at an angle with respect to the horizontal, providing an open space below said bottom surface.

13. The apparatus according to claim 11 wherein said attachment assembly includes a side wall portion that is clamped juxtaposed adjacent a side wall portion of said keyboard when it is attached to said keyboard to position said entire attachment assembly to the side of and above the bottom of said keyboard for maintaining a keyboard as portable and having the same footprint area.

14. A computer command apparatus for entering commands into a computer having a keyboard as a part thereof, comprising:
    a housing;
    a pointing device means within said housing for generating electrical signals translatable as commands to said computer; and
    an attachment means coupled to said housing, said attachment means being adapted to be removably attached to said computer for removably attaching said pointing device means to said computer, said attachment means including a rotatable member coupled to said housing and a stationary member adapted to be coupled to said keyboard, said rotatable member permitting said housing to be alternatively positioned and in a generally horizontal orientation or in generally a vertical orientation.

15. A computer command apparatus for entering commands into a computer having a keyboard as a part thereof, comprising:
    a housing;
    a pointing device means within said housing for generating electrical signals translatable as commands to said computer said positioning device including a rotatable ball extending from a top surface of said housing for direct contact with and rotation by a user's thumb; and
    an attachment means for removably attaching said pointing device means to said computer, said attachment means including a angled member for retaining said housing and said pointing device within said housing at an angled orientation with respect to the horizontal.

16. The apparatus according to claim 15 wherein said angle is 45 degrees.

17. The pointing device according to claim 15 wherein said attachment assembly includes:
    an attachment assembly that is removably coupled to said housing; and
    a rotatable member permitting said housing to be alternatively positioned in a user selected orientation with respect to the horizontal.

18. A computer command apparatus for entering commands into a computer, comprising:
    a housing;
    a rotatable ball within said housing;
    a first ball retaining member in abutting contact with said ball below a horizontal centerline of said ball;
    a pair of encoder shafts within said housing and in frictional contact with said ball such that rotation of said ball causes said encoder shafts to rotate;
    a second ball retaining member positioned above the horizontal centerline of said ball, said second ball retaining member being adapted to retain said ball within said housing and in frictional contact with said pair of encoder shafts regardless of the elevational orientation of said housing; and
    a spring member assembly within said housing, said spring member assembly being positioned to retain said encoder shafts in frictional contact with said ball regardless of the elevational orientation of said housing;
    an attachment assembly removably coupled to said housing, said attachment assembly being adapted to be removably adapted to said computer with said computer supporting the entire weight of the attachment assembly and housing having the rotatable ball therein, the attachment assembly being removably attached to said housing and including a computer attachment member which is attachable to said computer to permit removably attaching said attachment assembly directly to said computer; and
    a stationary member as a part of said attachment assembly, said stationary member adapted to be coupled directly to said computer and including a variable width clamp means for coupling to said computer at a selected one of many different locations on said computer.

19. The apparatus according to claim 18 wherein said spring member assembly is positioned above the horizontal centerline of said ball and bias said retaining member into abutting contact with said ball.

20. The apparatus according to claim 18 wherein said spring member assembly includes a molded leaf spring.

21. The apparatus according to claim 18 wherein said spring member assembly includes a pair of springs that are positioned below the horizontal center line of the ball and are respectively coupled to bias said pair of the encoding shafts into frictional contact with said ball.

22. The apparatus according to claim 21 wherein said springs are coil springs.

23. The apparatus according to claim 18 wherein said retaining member is removeably coupled to said housing, said retaining member being a separate member from said housing.

24. The apparatus according to claim 18 wherein said retaining member includes a plurality of protuberances extending towards an interior surface at said housing and acting as fixed bearings to provide a smooth surface for rotational contact of said ball.

25. The apparatus according to claim 18 wherein said retaining member includes a plurality of bearings to provide a substantially friction-free surface in an inner surface of said retaining member to provide a smooth surface for rotation of the ball.

26. The apparatus according to claim 24 wherein said bearings are fixed bearings.

27. A computer command apparatus for entering commands into a computer, comprising:
    a housing, said housing including a lower housing member and an upper housing member;
    a rotatable ball within said housing;
    a first ball retaining member in abutting contact with said ball below a horizontal centerline of said ball;
    a pair of encoder shafts within said housing and in frictional contact with said ball such that rotation of said ball causes said encoder shafts to rotate;

a second ball retaining member removably coupled to said upper housing member, said second ball-retaining member being positioned above the horizontal centerline of said ball, and being adapted to retain said ball within said housing and in frictional contact with said pair of encoder shafts regardless of the elevational orientation of said housing; and a spring member assembly within the second ball retaining member, said spring member assembly being positioned to retain said encoder shafts in frictional contact with said ball regardless of the elevational orientation of said housing;

an attachment assembly removably coupled to said housing, said attachment assembly being adapted to be removably adapted to said computer with said computer supporting the entire weight of the attachment assembly and housing having the rotatable ball therein, the attachment assembly being removably attached to said housing and including a computer attachment member which is attachable to said computer to permit removably attaching said attachment assembly directly to said computer; and a stationary member as a part of said attachment assembly, said stationary member adapted to be coupled directly to said computer and including a variable width clamp means for coupling to said computer at a selected one of many different locations on said computer.

28. The apparatus according to claim 27 wherein said second ball-retaining member includes a ball-retaining ring removably coupled to said upper housing member, said ball-retaining ring having an aperture smaller than the diameter of said ball for retaining said ball within said housing and in frictional contact with said pair of encoder shafts regardless of the elevational orientation of said housing, and said retaining ring member having an outside diameter which is larger than said ball for permitting said ball to be removed from said housing when said retaining ring is not coupled to said housing.

29. A computer command apparatus for entering commands into a computer having a keyboard as a part thereof, comprising:

a housing;

a pointing device means within said housing for generating electrical signals translatable as commands to said computer; and an attachment assembly removably coupled to said housing, said attachment assembly being adapted to be removably attached to said computer with said computer supporting the entire weight of the attachment assembly and pointing device, said attachment assembly being removably attached to said housing having said pointing device therein to permit the removable attachment of said pointing device means to said computer, said attachment assembly including a computer attachment member which is attachable to said computer to permit removably attaching said attachment assembly directly to said computer;

an electrical coupling extending between said housing and said attachment means and an electrical coupling extending between said attachment means and said computer.

* * * * *